United States Patent [19]

Hoffmann et al.

[11] 4,112,061

[45] * Sep. 5, 1978

[54] PRODUCTION OF SODIUM SULFITE UTILIZING MOTHER LIQUOR FROM THE SODIUM METABISULFITE PROCESS

[75] Inventors: Robert Joel Hoffmann, Liverpool; Samuel Louis Bean, Jamesville; Philip Seeling, N. Syracuse; James William Swaine, Jr., Manlius, all of N.Y.

[73] Assignee: Allied Chemical Corporation, Morris Township; Morris County, N.J.

[*] Notice: The portion of the term of this patent subsequent to Jan. 18, 1994, has been disclaimed.

[21] Appl. No.: 711,326

[22] Filed: Aug. 3, 1976

Related U.S. Application Data

[63] Continuation-in-part of Ser. No. 653,876, Jan. 30, 1976, Pat. No. 4,003,985.

[51] Int. Cl.² .............................................. C01D 5/14
[52] U.S. Cl. .................................. 423/512 A; 423/519
[58] Field of Search .................. 423/512 A, 519, 242, 423/244

[56] References Cited

U.S. PATENT DOCUMENTS

| | | | |
|---|---|---|---|
| 1,865,754 | 7/1932 | Hand | 423/512 A |
| 1,937,944 | 12/1933 | Butler | 423/512 A X |
| 2,719,075 | 9/1955 | Allen | 423/512 A X |
| 2,899,273 | 8/1959 | Murphy | 423/512 A X |
| 3,216,793 | 11/1965 | Spormann et al. | 423/512 A X |
| 3,305,307 | 2/1967 | Spormann et al. | 423/512 A |
| 3,361,524 | 1/1968 | Spormann et al. | 423/512 A |
| 3,622,443 | 11/1971 | Galeano | 423/512 A X |
| 4,003,985 | 1/1977 | Hoffman et al. | 423/512 A |

FOREIGN PATENT DOCUMENTS

| | | | |
|---|---|---|---|
| 646,115 | 10/1964 | Belgium | 423/512 |
| 45-12,572 | 5/1970 | Japan | 423/512 A |

*Primary Examiner*—Jack Cooper
*Attorney, Agent, or Firm*—Gerhard H. Fuchs; Anthony J. Stewart

[57] ABSTRACT

Anhydrous sodium sulfite is made by a process involving introducing substantially anhydrous sodium carbonate concurrently with impurities-containing mother liquor from which sodium metabisulfite crystals have been crystallized and sulfur dioxide-containing gas into a saturated solution of sodium sulfite maintained at pH of between about 6.5 and about 7.6 at temperature above about 35° C. to form a slurry of anhydrous sodium sulfite crystals, and withdrawing the crystals from the slurry. The process is initiated using a concentrated sodium sulfite solution containing less than about 3 ppm of dissolved iron.

14 Claims, 1 Drawing Figure

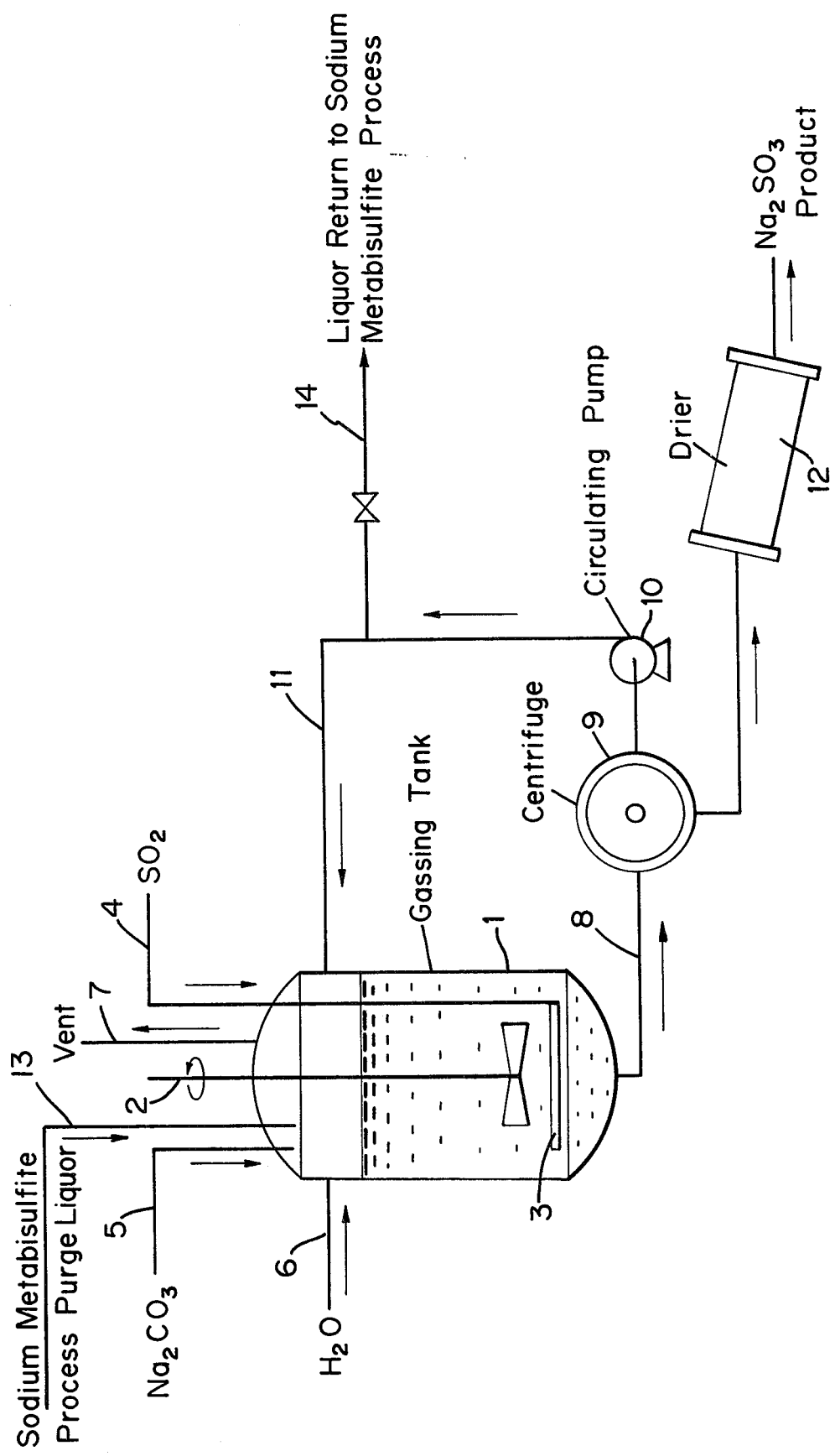

PRODUCTION OF SODIUM SULFITE UTILIZING MOTHER LIQUOR FROM THE SODIUM METABISULFITE PROCESS

CROSS-REFERENCE TO RELATED APPLICATION

This application is a continuation-in-part of our co-pending U.S. application Ser. No. 653,876 now U.S. Pat. No. 4,003,985, filed Jan. 30, 1976.

BACKGROUND OF THE INVENTION

In the manufacture of sodium metabisulfite by reacting sodium carbonate (or sodium hydroxide) with sulfur dioxide in an aqueous medium in accordance with the following equations:

(1) $Na_2CO_3 + SO_2 \rightarrow Na_2SO_3 + CO_2$
(2) $Na_2SO_3 + SO_2 \rightarrow Na_2S_2O_5$ and recovering the sodium metabisulfite from the mother liquor by crystallization, soluble iron, calcium and sulfate impurities inevitably accumulate in the mother liquor. These impurities are introduced by the raw materials and through plant operation. As they accumulate, these impurities tend to contaminate the product and render it unacceptable for photographic and certain other uses. As a result, some of the mother liquor from the process must be purged from the system in order to maintain contamination of the sodium metabisulfite product within permissible limits. Since the purge liquor contains considerable sodium and sulfur values, recovery or purification of the purged liquor by some economical means is desirable. The literature is replete with suggestions for removing soluble impurities from solutions containing the same by methods such as coagulation, absorption, precipitation, extraction, ion exchange, electrolysis, or the like. All of these however, have disadvantages such as expense or interference with normal plant operation, or they may raise disposal and/or pollution problems.

Sodium sulfite is commonly made by reacting soda ash with sulfur dioxide in an aqueous medium. Sulfur dioxide-containing gas is passed through an aqueous solution of sodium carbonate to form a solution of sodium bisulfite, which is then neutralized, as by addition of further sodium carbonate or of sodium hydroxide to form the desired sodium sulfite. When sodium carbonate is used for neutralization, the solution is boiled to expel evolved carbon dioxide. From the neutralized solution sodium sulfite is obtained by crystallization. If crystallization is carried out below about 35° C., the crystals formed are sodium sulfite heptahydrate ($Na_2SO_3 \cdot 7H_2O$), which can be transformed into the anhydrous form by heating above about 35° C. At about that temperature the heptahydrate melts incongruently, forming anhydrous sodium sulfite and solution. Alternatively, crystallization of sodium sulfite from the neutralized solution can be conducted at temperatures above 35° C. by evaporating water from the solution, as by boiling it, in which case the crystals formed are anhydrous sodium sulfite. The process involved here, however, is a two step process: formation of sodium bisulfite in the first step, followed by neutralization thereof to form sodium sulfite in the second step. Processes for making sodium sulfite involving the above-described reaction have, for example, been described in U.S. Pat. Nos. 1,937,944 to Butler; 2,080,528 to Bowman et al.; 2,719,075 to Allen; 2,899,273 to Murphy; and 3,361,524 and 3,216,793 to Sporman et al. These patents generally are concerned with methods for obtaining anhydrous alkali metal sulfite of relatively high degree of purity, hence include certain further purification steps not of consequence here.

Single-step processes for making anhydrous sodium sulfite are also known and have been described, for example, in U.S. Pat. Nos. 3,305,307 to Sporman et al. and 3,213,412 to Carey et al. According to the Sporman et al. patent, solid alkali metal sulfite salt is obtained by contacting an aqueous solution of a suitable alkali metal compound — such as sodium hydroxide, sodium carbonate, sodium bicarbonate, and the like — with substantially dry sulfur dioxide-containing gas at temperature sufficiently high that the water introduced with the solution and formed by the reaction of the alkali metal compound with the sulfur dioxide is immediately vaporized. The patent to Carey describes a process wherein an alkali metal salt, such as carbonate of soda, is moistened by contact with a small quantity of water or steam, and the moistened salt is subjected to the action of sulfur dioxide-containing gas. Processes of that kind, however, result in formation of sodium sulfite of relatively low degree of purity, as discussed by Carey et al. in U.S. Pat. No. 3,213,412.

It is an object of the present invention to provide a method for producing anhydrous sodium sulfite by reaction of sodium carbonate and impurities-containing mother liquor (purge liquor) from which sodium metabisulfite crystals have been obtained by crystallization with sulfur dioxide gas in an aqueous medium to obtain crystalline anhydrous sodium sulfite in one-step procedure.

It is a further object of the present invention to provide a method for obtaining substantially concentrated solutions of sodium sulfite of high degree of purity from which sodium sulfite crystals, both anhydrous as well as heptahydrate, may be crystallized in substantially pure form, or which solution may be used in the process for making sodium metabisulfite from sodium carbonate or sodium hydroxide and sulfur dioxide-containing gas.

SUMMARY OF THE INVENTION

In accordance with the present invention there is provided a method for producing anhydrous sodium sulfite from sodium carbonate, impurities-containing mother liquor from the sodium metabisulfite process, and sulfur dioxide, comprising (a) forming a saturated aqueous solution of sodium sulfite containing less than about 3 ppm of dissolved iron, basis the solution, and adjusting the pH of said solution to within the range of from about 6.5 to about 7.6;

(b) introducing into said solution substantially anhydrous sodium carbonate concurrently with impurities-containing mother liquor from which sodium metabisulfite crystals have been obtained by crystallization and a sulfur dioxide-containing gas stream, so proportioned with respect to each other as to maintain the pH of said solution within the range of from about 6.5 to 7.6, while maintaining the temperature of said solution above about 35° C. to form a slurry of anhydrous sodium sulfite crystals; and (c) separating anhydrous sodium sulfite crystals from said slurry.

The liquid portion of the slurry from which anhydrous sodium sulfite crystals have been separated can be returned to the sodium metabisulfite process.

Sodium sulfite can be made in a one-step process by the above procedure, provided the process is initiated in a saturated aqueous solution of sodium sulfite which contains less than about 3 ppm of dissolved iron, and provided further it is conducted within a certain critical pH range. If the process is initiated in a sodium sulfite solution containing more than about 3 ppm of iron, a supersaturated solution of sodium sulfite is formed. Supersaturation seems to be carried to relatively high degree, and seems to persist for relatively extended periods of time, until it is released by sudden precipitation of a dense shower of sodium sulfite crystals of extremely fine particle size, resulting in formation of an intractible mass from which usable sodium sulfite crystals cannot be recovered by practical methods, such as filtration. We believe that this is the reason why workers in the art heretofore had resorted to either the above-described two step processes for making sodium sulfite, involving first formation of sodium bisulfite, followed by neutralization thereof to form sodium sulfite, or to those processes involving formation of sodium sulfite in substantially dry state.

Use of purge liquor from the sodium metabisulfite process as partial raw material for making sodium sulfite in accordance with the above-described process, permits ready recovery of sodium and sulfur values from that liquor. Since sodium sulfite and sodium metabisulfite operations are in many instances carried on concurrently, ready means for disposal of sodium metabisulfite process purge liquor is provided. The amount of sodium metabisulfite purge liquor which can be used as partial source of raw material is principally limited to two considerations: (1) the need for maintaining the pH in the reaction medium within the range of from about 6.5 to about 7.6; and (2) the level of iron contamination in the purge liquor. Sodium metabisulfite process purge liquor containing dissolved iron as impurity may be introduced into the reaction medium only at such rate that the iron impurity substantially immediately associates with the new and growing sodium sulfite crystals. If the sodium metabisulfite process purge liquor is introduced at a rate greater than that at which the iron introduced through it becomes associated with the newly forming and growing sodium sulfite crystals, then the concentration of dissolved iron in the mother liquor will build up, tending to cause massive supersaturation of the liquor with respect to sodium sulfite and subsequent rapid precipitation of large quantities of very small sodium sulfite crystals, resulting in production of an intractible mass, foaming and ultimate termination of the reaction.

Typical composition of purge liquor from the sodium metabisulfite process from which sodium metabisulfite crystals have been obtained by crystallization may vary within the ranges stated below:

$NaHSO_3$: about 20 to about 40% by weight
$Na_2SO_3$: about 0.1 to about 3% by weight
$Na_2SO_4$: about 0.5 to about 15% by weight
Fe: about 5 to about 50 ppm
pH: about 4.3 to about 5.2
Ca: about 3 to about 50 ppm Generally, the sodium metabisulfite process mother liquor may be fed to the sodium sulfite process in accordance with our invention in amount to provide up to about 70 percent of the total amount of sodium ion introduced as raw material, ordinarily up to about 30 percent, preferably up to about 15 percent of the total amount of sodium ion introduced as raw material to the sodium sulfite process. For reasons above explained, higher proportions of such purge liquor can be utilized, if the purge liquor is relatively low in iron impurities, and, conversely, increasing amounts of impurities, especially iron impurities, will tend to limit the amount of purge liquor that can be tolerated by the sodium sulfite process.

Sodium sulfite mother liquor from the sodium sulfite process from which anhydrous sodium sulfite crystals have been separated and from which dissolved iron and calcium impurities have been substantially removed by coprecipitation with the sodium sulfite crystals can be returned to the sodium metabisulfite process. In substance, our invention process provides a means for removing impurities from the mother liquor of the sodium metabisulfite process.

In the sodium sulfite process of our invention, once the reaction has been initiated in a saturated aqueous solution of sodium sulfite containing less than about 3 ppm of dissolved iron, basis the solution, and crystals of anhydrous sodium sulfite are being formed, then iron may be introduced into the reaction medium, as e.g. an impurity in the sodium carbonate and/or the sodium metabisulfite purge liquor, without adverse effect on further formation of sodium sulfite crystals. Indeed, we have surprisingly found that when sodium sulfite is crystallized at elevated temperature above about 35° C. and up to the boiling point of the solution from a saturated solution of sodium sulfite containing dissolved iron as impurity, then the iron reports almost quantitatively to the sodium sulfite crystals being precipitated, leaving a sodium sulfite mother liquor practically free of iron, that is containing nondetectible amounts of iron as determined by the ammonium thiocyanate test. Thus, we have found that in the method of our invention for producing anhydrous sodium sulfite it is only critical that the reaction be initiated in an aqueous medium containing less than about 3 ppm of dissolved iron, basis the solution, but that once crystal formation is under way, the process is capable of tolerating input of substantial amounts of iron, which will be included in the sodium sulfite product as an impurity.

In the method of producing anhydrous sodium sulfite in accordance with our invention the pH of the aqueous reaction medium must be critically maintained within the range of from about 6.5 to about 7.6. If the pH is permitted to go above about 7.6 for substantial periods of time while the process is in progress, conversion of the sodium carbonate to sodium sulfite is inhibited or does not occur at all. If, on the other hand, the pH is permitted to fall below about 6.5 for substantial periods of time, sodium bisulfite is formed at rapidly increasing rate, which appears to inhibit growth of sodium sulfite crystals, resulting in formation of excessive amounts of small crystals which cannot readily be separated from the reaction medium, coupled with excessive foaming of the reaction medium.

Further, the process must be conducted at temperatures above about 35° C. and up to the boiling point of the reaction medium. If conducted below about 35° C., anhydrous sodium sulfite does not crystallize from the reaction medium but the sodium sulfite heptahydrate is obtained instead.

BRIEF DESCRIPTION OF THE DRAWING

For purposes of explaining this invention and presenting one specific embodiment thereof, reference is made to the accompanying drawing which represents a simplified schematic flow diagram of an embodiment of the present invention showing a continuous process for making sodium sulfite.

DETAILED DESCRIPTION OF THE INVENTION, OF THE PREFERRED EMBODIMENTS AND OF THE BEST MODE PRESENTLY CONTEMPLATED FOR ITS PRACTICE

With reference to the drawing, equipment employed in the embodiment of the process of the present invention thereby illustrated includes gassing tank 1, agitator 2, sparger 3 connected to sulfur dioxide-containing gas feed line 4, soda ash feed line 5, water feed line 6, sodium metabisulfite purge liquor feed line 13 and vent 7, all associated with gassing tank 1. Equipment further includes centrifuge 9 for separating liquid and solid phases of the slurry from gassing tank 1, circulating line 10 for returning mother liquor to gassing tank 1, and dryer 12. Optionally, there may be provided line 14 for return of sodium sulfite mother liquor to the sodium metabisulfite process. Desirably, the equipment is constructed of corrosion resistant material such as stainless steel.

On start-up of operation, there is provided in gassing tank 1 a saturated solution of sodium sulfite. It is essential that the solution contains less than about 3 ppm of dissolved iron, basis the solution. Sodium sulfite solution of such low iron content may, for example, be prepared by dissolving iron-free sodium sulfite in water. Alternatively, such solution may be prepared by subjecting a concentrated solution of sodium sulfite containing more than about 3 ppm of dissolved iron, basis the solution, to crystallization at temperature above about 35° C. as by boiling the solution to precipitate anhydrous sodium sulfite crystals therefrom, and separating the sodium sulfite crystals from the mother liquor. The mother liquor from which sodium sulfite crystals have been thus separated will be essentially iron-free, that is to say it will contain less than about 3 ppm of dissolved iron. Such iron-free sodium sulfite solution may also be prepared by reacting iron-free sodium carbonate with sulfur dioxide-containing gas in aqueous solution at pH in the neighborhood of about 7 in substantially iron-free water. In any event, the method by which the saturated sodium sulfite solution containing less than about 3 ppm iron, basis the solution, is prepared is not critical.

In operation of the embodiment illustrated by the drawing, the substantially iron-free (containing less than about 3 ppm of dissolved iron, basis the solution) concentrated sodium sulfite solution in gassing tank 1 is adjusted to pH within the range of from about 6.5 to about 7.6, as by addition of soda ash or sodium hydroxide if its pH is below about 6.5, or as by bubbling sulfur dioxide-containing gas through it, if its pH is above about 7.6. It is heated to temperature above about 35° C. by means of heating equipment (not shown). Soda ash is introduced into gassing tank 1 via soda ash feed line 5, and sodium metabisulfite process purge liquor is introduced via feed line 13, while concurrently sulfur dioxide-containing gas is bubbled into the solution by means of sparger 3. Inert gases, such as nitrogen, which may be introduced with the sulfur dioxide-containing gas stream, as well as carbon dioxide formed in the reaction are vented from gassing tank 1 through vent 7. Substantially anhydrous sodium carbonate in the form of light or dense soda ash, preferably dense soda ash, sodium metabisulfite process purge liquor and sulfur dioxide-containing gas are fed to gassing tank 1 so proportioned with respect to each other as to maintain the pH of the solution within gassing tank 1 within the range of from about 6.5 to about 7.6 throughout the operation. This can be simply accomplished by continually or intermittently monitoring the pH, as by means of a pH meter, and adjusting either one or more of the soda ash, sodium metabisulfite purge liquor and sulfur dioxide feed responsive to changes in the pH. Thus, should the pH tend to increase and threaten to become more basic than indicated by pH of 7.6, one could reduce the soda ash feed rate or increase the purge liquor and/or sulfur dioxide feed rate, or make these adjustments concurrently. Conversely, should the pH tend to drift towards the acidic side, one could increase the soda ash feed rate or decrease the purge liquor and/or sulfur dioxide feed rate, or make these adjustments concurrently.

The temperature within the vessel during the gassing operation must be maintained above about 35° C. Ordinarily, the heat of reaction will be sufficient to maintain the temperature at that level. However, under certain circumstances it may be necessary or desirable to apply heat to gassing tank 1 to maintain temperature above about 35° C.

As the reaction proceeds, anhydrous sodium sulfite will precipitate in crystalline form, forming a slurry of sodium sulfite crystals in saturated sodium sulfite mother liquor. The crystals are held in suspension by means of agitator 2. Crystal slurry is withdrawn from gassing tank 1 via slurry line 8 and fed to centrifuge 9 wherein liquid and solid phases are separated. The liquid phase (sodium sulfite mother liquor) is returned to gassing tank 1 by means of circulating pump 10 via mother liquor return line 11. A portion of the sodium sulfite mother liquor may be returned to the sodium metabisulfite process, the purge liquor of which has beed used as partial source of raw material in the present process. Desirably, the amount of sodium sulfite mother liquor so returned is sufficient to maintain desired water balance in the sodium sulfite and sodium metabisulfite processes thus functionally interconnected. Crystals of anhydrous sodium sulfite which are separated in centrifuge 9 may, if desired, be washed using small amounts of water to remove adhering mother liquor, and the crystals so washed may then be dried in dryer 12, as by intimately contacting them with heated air to obtain dry anhydrous sodium sulfite product. Liquor level within the system may further be maintained by adding water, as required, via water feed line 6 to gassing tank 1, although water may also be introduced to other points within the system (not shown), if desired.

Any commercial form of sodium carbonate (soda ash) is suitable for use in our process. We have found, however, that that form of commercial grade sodium carbonate known as dense soda ash is particularly desirable for use in our process, since dense soda ash readily disperses and dissolves in the reaction medium and reacts quickly with the sulfur dioxide. Commercial grade light soda ash is also suitable. However, its use seems to require more efficient agitation of the reaction medium, or else the soda ash tends to agglomerate and to acquire a surface coating of sodium sulfite, which seemingly retards the rate of reaction. For these reasons we prefer to use dense soda ash. It should be understood, however, that water-containing crystalline forms of sodium carbonate are also suitable for use in our process, subject only to the limitation that the water introduced with the sodium carbonate may not be of such amount as to upset the water balance in the system. Thus, sodium carbonate monohydrate is suitable for use in our process. It is also possible to partially substitute sodium bicarbonate, sodium hydroxide, or sodium bisulfite for the sodium carbonate, in solid form or in solution, and the appended claims are intended to cover partial use of such materials in our process.

Sulfur dioxide-containing gas suitable for use in our process may be obtained from any convenient source, such as combustion of sulfur or roasting of sulfide ores. The volume ratio of sulfur dioxide in the sulfur dioxide-containing gas is not critical. Sulfur dioxide-containing gas may contain as little as about 1 percent by volume of sulfur dioxide, or it may consist of 100 percent sulfur dioxide. In usual commercial plant operation, sulfur dioxide-containing gas as obtained by combustion of sulfur or roasting of sulfide ores usually contains about 8 to about 20 percent by volume of sulfur dioxide. If desired, the sulfur dioxide-containing gas stream may, prior to introduction into the process, be purified, e.g. by removal of dust therefrom as by scrubbing, precipitation or filtration, or by washing it so as to minimize contamination of the process liquor.

The process of our invention can be effectively conducted at pH within the range of from about 6.5 to about 7.6, is preferably conducted at pH within the range of from about 7.0 to 7.5 and, more preferably yet, within the range of from about 7.25 to 7.45.

Preferably, the invention process is initiated in an aqueous medium containing less than about 2 ppm of dissolved iron, basis the solution and, more preferably yet, in an aqueous medium containing less than about 1 ppm of dissolved iron.

The temperature of the reaction medium must be maintained above about 35° C., or else anhydrous sodium sulfite is not obtained but instead crystals formed in the liquor will be those of the sodium sulfite heptahydrate, $Na_2SO_3.7H_2O$. The upper temperature limit is the boiling point of the reaction medium at prevailing pressure conditions. The preferred temperature range is from about 50° to about 80° C. The reaction may be conducted under subatmospheric or superatmospheric pressure, as desired, although ordinarily atmospheric pressure conditions would be preferred for the sake of convenience.

The concentration of solid sodium sulfite crystals within the reaction medium may vary within wide ranges, depending on the ability of the agitator to maintain the suspension of sodium sulfite crystals sufficiently homogeneous. Typical solids concentration may range from about 1 to about 60 percent by volume, preferably from about 20 to 40 percent by volume.

EXAMPLE I

A stainless steel reactor equipped with agitator, temperature control and sparger for introducing sulfur dioxide-containing gas, having a volume of 10 gallons and a working capacity of about 9 gallons, is charged with about 9 gallons of a saturated solution of sodium sulfite at temperature of about 60° C., containing less than about 1 ppm of dissolved iron, basis the solution. Under constant agitation commercial grade dense soda ash is charged to the reactor at the rate of 13.3 grams per minute, while concurrently sulfur dioxide-containing gas containing about 20 percent by volume of sulfur dioxide is sparged through the liquor within the reactor at a rate sufficient to provide 8.0 grams per minute of sulfur dioxide. Concurrently with the sulfur dioxide and sodium carbonate there is fed purge liquor from a sodium metabisulfite process at a rate of 5.8 milliliters per minute. The purge liquor has the following composition:

| $NaHSO_3$ | 34.4 | percent (by weight) |
| $Na_2SO_3$ | 1.8 | percent |
| $Na_2SO_4$ | 3.6 | percent |
| Fe | 31 | ppm |
| Ca | 26 | ppm |
| pH | 5.0 | |

Throughout the operation the temperature of the liquid reaction medium with the reactor is maintained at temperature between 50° and 75° C., and its pH is controlled between about 7.2 and 7.5 by making minor adjustments on the soda ash and sulfur dioxide feed rates. Crystals of anhydrous sodium sulfite precipitate from the reaction medium as the reaction proceeds. These crystals are permitted to accumulate within the reaction medium to solids level of between about 14 to 40 percent by volume. Periodically, liquid reaction medium is withdrawn from the reactor, sodium sulfite crystals are separated from the mother liquor by filtration and the mother liquor is returned to the reactor, thereby maintaining the crystal volume within the reactor between about 14 and 40 percent by volume.

During a run of continuous operation, liquor samples are taken at periodic intervals, crystals and mother liquor are separated and the sodium sulfite product and the mother liquor are analyzed. Results are shown in Table I, below.

TABLE I

| | Reaction Liquor | | | Sodium Sulfite Product | | |
|---|---|---|---|---|---|---|
| Elapsed Time | $Na_2SO_3$ (%) | $NaHSO_3$ (%) | Fe (ppm) | $Na_2SO_3$ (%) | $Na_2CO_3$ (%) | Fe (ppm) |
| 4 hrs. | 23.38 | 1.54 | 0.05 | | | |
| 8 | 23.25 | 0.94 | 0.91 | 97.4 | 0.37 | 29 |
| 12 | 23.51 | 0.94 | 0.03 | | | |
| 16 | 23.37 | 1.37 | 0.12 | 96.9 | 0.78 | 20 |

EXAMPLE II

The procedure of Example I is repeated, adding sodium metabisulfite process purge liquor at a rate of 23 milliliters per minute over an 8-hour period, adjusting feed rates of sodium carbonate and sulfur dioxide to compensate for the increased rate of addition of the sodium metabisulfite process purge liquor to maintain pH within the required limits. The sodium metabisulfite process purge liquor has the following composition:

| $NaHSO_3$ | 26.2 | percent (by weight) |
| $Na_2SO_3$ | 0.15 | percent |
| $Na_2SO_4$ | 10.21 | percent |
| Fe | 50 | ppm |
| Ca | 13 | ppm |

Purified sodium sulfite solution is withdrawn from the reactor at a rate of 33 millimeters per minute. A total of about 18 liters of purified sodium sulfite solution saturated with respect to sodium sulfite are thus obtained. Analytical results on periodically taken samples of reaction liquor and sodium sulfite crystal solids are summarized in Table II, below, wherein percent are by weight. The purified sodium sulfite solution is recycled to the sodium metabisulfite process.

TABLE II

| | Reaction Liquor | | | | Sodium Sulfite Product | | | |
|---|---|---|---|---|---|---|---|---|
| Elapsed Time | $Na_2SO_3$ (%) | $Na_2SO_4$ (%) | Fe (ppm) | Ca (ppm) | $Na_2SO_3$ (%) | $Na_2SO_4$ (%) | Fe (ppm) | Ca (ppm) |
| 1 (hours) | 22.39 | 1.44 | <1 | 1.4 | | | | |
| 2 | 21.73 | 1.54 | <1 | 0.7 | 96.38 | 4.20 | 50 | 13 |
| 3 | 21.64 | 1.64 | <1 | 1.1 | 96.44 | 2.84 | 55 | 13 |
| 4 | 21.81 | 1.78 | 1.4 | 1.3 | 96.67 | 2.74 | 41 | 13 |
| 5 | 21.43 | 1.88 | 2.9 | 1.0 | 96.28 | 2.91 | 42 | 13 |
| 6 | 22.49 | 2.05 | <1 | 0.9 | 96.51 | 2.83 | 50 | 12 |
| 7 | 19.98 | 2.47 | 1.3 | 1.7 | 96.51 | 2.77 | 46 | 11 |
| 8 | 21.10 | 2.49 | <1 | 0.5 | 96.42 | 2.95 | 46 | 11 |

Since various changes may be made in carrying out the process of our invention without departing from its scope and essential characteristics, all matter contained in the above description shall be interpreted as illustrative only, the scope of our invention being defined by the appended claims.

We claim:

1. The process for making anhydrous sodium sulfite comprising:
   (a) forming a saturated aqueous solution of sodium sulfite containing less than about 3 ppm of dissolved iron, basis the solution, and adjusting the pH of said solution to within the range of from about 6.5 to about 7.6;
   (b) introducing into said solution substantially anhydrous sodium carbonate concurrently with mother liquor from which sodium metabisulfite crystals have been obtained by crystallization and a sulfur dioxide-containing gas stream, so proportioned with respect to each other as to maintain the pH of said solution within the range of from about 6.5 to about 7.6, while maintaining the temperature of said solution above about 35° C. to form a slurry of anhydrous sodium sulfite crystals; and
   (c) separating anhydrous sodium sulfite crystals from said slurry.

2. The process of claim 1 wherein the saturated aqueous solution of sodium sulfite contains less than about 1 ppm of dissolved iron.

3. The process of claim 1 wherein in step (b) the pH of the solution is maintained within the range of from about 7.0 to 7.5.

4. The process of claim 1 wherein in step (b) the temperature of the solution is maintained between about 50° and 80° C.

5. The process of claim 1 wherein the sodium carbonate is dense soda ash.

6. The process of claim 1 wherein in step (b) the pH of the solution is maintained within the range of from about 7.25 to about 7.45.

7. The process of claim 1 wherein the saturated aqueous solution of sodium sulfite contains less than about 2 ppm of dissolved iron.

8. The process of claim 1 wherein the mother liquor from which sodium metabisulfite crystals have been obtained by crystallization provides up to about 30 percent of the total amount of sodium introduced into the process.

9. The process of claim 8 wherein the mother liquor from which sodium metabisulfite crystals have been obtained by crystallization contains up to about 50 ppm of dissolved iron.

10. The process of claim 9 wherein the sodium carbonate is dense soda ash, and wherein in step (b) the pH of the solution is maintained within the range of from about 7.25 to about 7.45.

11. The process of claim 10 wherein in step (b) the temperature of the solution is maintained between about 50° and 80° C.

12. The process of claim 1 wherein the saturated aqueous solution of sodium sulfite contains less than about 1 ppm of dissolved iron, wherein the sodium carbonate is dense soda ash, wherein in step (b) the pH of the solution is maintained within the range of from about 7.25 to about 7.45, and the temperature of the solution is maintained between about 50° and about 80° C., and wherein the mother liquor from which sodium metabisulfite crystals have been obtained by crystallization provides up to about 70 percent of the total amount of sodium ion introduced into the process.

13. The process of claim 1 wherein the mother liquor from which sodium metabisulfite crystals have been obtained by crystallization is obtained from the process for making sodium metabisulfite from sodium carbonate or sodium hydroxide and sulfur dioxide-containing gas, and wherein part of the sodium sulfite liquor from which sodium sulfite crystals have been separated is recycled to the sodium metabisulfite process.

14. The process of claim 12 wherein the mother liquor from which sodium metabisulfite crystals have been obtained by crystallization is obtained from the process for making sodium metabisulfite from sodium carbonate or sodium hydroxide and sulfur dioxide-containing gas, and wherein part of the sodium sulfite liquor from which sodium sulfite crystals have been separated is recycled to the sodium metabisulfite process.

* * * * *